United States Patent Office 3,284,484
Patented Nov. 8, 1966

3,284,484
FLUORINATED AROMATIC NITRILES AND PREPARATION THEREOF
Leon Jerzy Belf and Michael William Buxton, Avonmouth, England, assignors to The National Smelting Company Limited, Avonmouth, England
No Drawing. Filed Apr. 2, 1963, Ser. No. 269,865
Claims priority, application Great Britain, Apr. 4, 1962, 12,995/62
7 Claims. (Cl. 260—465)

This invention relates to a method for the preparation of fluorinated aromatic nitriles, and more especially to a method for preparing 2,3,4,5,6-pentafluorobenzonitrile (hereinafter called pentafluorobenzonitrile), 1,2-dicyano-3,4,5,6-tetrafluorobenzene (hereinafter called 1,2-dicyanotetrafluorobenzene), 1,3 - dicyano-2,4,5,6-tetrafluorobenzene (hereinafter called 1,3-dicyanotetrafluorobenzene) and 1,4-dicyano-2,3,5,6-tetrafluorobenzene (hereinafter called 1,4-dicyanotetrafluorobenzene).

Perfluoroaryl nitriles and dinitriles are a class of perfluoroaromatic compounds which hitherto, for all practical purposes, are unknown to the art. Although there are references in the literature to attempt to prepare pentafluorobenzonitrile ("Pospects for Fluoroaromatic Polymers," by W. J. Pummer and L. A. Wall, National Bureau of Standards; also Pummer, W. J., and Wall, L. A., J. Res. Natl. Bur. Standards, 1959, 63A, No. 2, 167), the experiments described therein either failed to give pentafluorobenzonitrile or gave a poor yield of pentafluorobenzonitrile. For example, attempts to synthesise this nitrile from hexafluorobenzene by treatment with cuprous cyanide or potassium cyanide gave only insoluble carbon-like solids. Again, the reaction of bromopentafluorobenzene with cuprous cyanide in pyridine solution gave unsatisfactory results. In this case, the reaction was extremely sensitive to heat and no identifiable products, other than some unchanged bromopentafluorobenzene, were recovered. In a similar reaction, using iodopentafluorobenzene and cuprous cyanide, an impure liquid product was obtained which was shown to contain some of the desired nitrile, since an hydrolysis with 75% sulphuric acid a 16% yield of pentafluorobenzoic acid was obtained.

This invention is based on the surprising discovery that treatment of a perfluoroaryl halide of the formula $C_6F_5X$, where $X=Br$, I or Cl, with cuprous cyanide in a polar solvent, such as dimethylformamide, preferably at the temperature and for the time specified below, gives substantial yields of pentafluorobenzonitrile. Moreover, the method is of general application, e.g. dinitriles may be similarly prepared. The nitriles thus prepared may be isolated from the product in a high degree of purity by fractional distillation or recrystallisation.

The invention consists in a method for preparing fluorinated aromatic nitriles, in which an aromatic fluorocarbon halide containing at least one nuclear chlorine, bromine, or iodine atom, is heated with cuprous cyanide in a polar solvent such as dimethylformamide.

It is convenient to carry out the reaction at between 140° C.–180° C. although temperatures outside this range may be used. It is also advantageous to carry out the reaction at these temperatures for four to eight hours, e.g. about 6 hours although both shorter and longer periods may be used. Shorter reaction times give a less complete conversion of the halide to the nitrile, while longer reaction times give a more complete conversion to the nitrile but the yield is not optimum. It is convenient to carry out the reaction at atmospheric pressure, but the reaction may be carried out at superatmospheric pressure or at sub-atmospheric pressure. Since the cuprous cyanide is not completely soluble in the reaction mixture, it is preferable to stir, or otherwise agitate, the reaction mixture, throughout the reaction period.

Dimethylformamide has been found to be an excellent solvent for this reaction, although other aprotic solvents such as N-methylpyrrolidone may be used. Using the preferred reaction times, the product may contain as much as 30% unchanged halide, but the yield of the nitrile calculated from the amount of halide consumed is between 65% and 80% in the case of pentafluorobenzonitrile, but is about 30% in the case of the, i.e. dicyanotetrafluorobenzene.

For preparing pentafluorobenzonitrile according to the invention, bromo- and iodo-pentafluorobenzene are preferred starting materials. For preparing dicyanotetrafluorobenzenes according to the invention the corresponding dibromo- or diiodo-tetrafluorobenzene is preferred.

The invention further consists in the new compounds 1,2-dicyanotetrafluorobenzene, 1,3-dicyanotetrafluorobenzene and 1,4-dicyanotetrafluorobenzene.

A good synthetic method for perfluoro-aromatic nitriles is of considerable importance because of the value of these compounds as synthetic intermediates. These nitriles undergo the reactions characteristic of aromatic nitriles, for example, hydrolysis gives first an amide and then a carboxylic acid. This hydrolysis reaction is of particular value for the preparation of pentafluorobenzoic acid. There is only one other route to this acid which could be used to prepare commercial quantities, namely carbonation of pentafluorophenyl magnesium halide in tetrahydrofuran solution (Harper, R. J., and Tamborski, C., Chem. and Ind., 1962, 1824) and the yields obtained using this procedure appear to be somewhat inferior to the yields obtained using the nitrile route described herein.

Furthermore, pentafluorobenzonitrile can be converted into a large variety of other compounds, since not only will the nitrile function react, for example, as described but there is also the possibility of replacing one or more ring fluorine atoms by other groups, such as $—NH_2$, $—SH$, $—NHNH_2$, by nucleophilic attack using reagents such as ammonia, sodium hydrosulphide, or hydrazine, hydrate. It is readily apparent that a wide variety of reactions can be carried out on these nitriles.

Pentafluorobenzoic acid, and accordingly the nitrile from which it is prepared, is a useful chemical intermediate since it may readily be elaborated into amides and substituted amides which are structurally analogous to and belong in the same chemical class as unfluorinated amides (e.g. $C_6H_5CON(C_2H_5)_2$), with hypnotic or antispasmodic properties. It will be seen that the value of the present invention lies in the fact that it overcomes any untypical and anomalous reactions, which may occur at or near the pentafluorophenyl nucleus to give an intermediate which is more readily amenable to more standard chemical reactions, and hence it opens up new fields of preparative organic chemistry. Moreover, as the dinitriles may be converted to the dicarboxylic acids, i.e. terephthalic, isophthalic and phthalic acids by hydrolysis, these dinitriles are also useful intermediates for preparing dyestuffs analogous to the rhodamine or phenolphthalein dyes.

Pentafluorobenzonitrile is also a useful solvent.

The invention will be further described with reference to the following examples, which are not to be construed as limiting the scope of the invention, within which various modifications may be made.

*Example 1*

A mixture of bromopentafluorobenzene (5.00 g.), cuprous cyanide (2.00 g.) and dimethylformamide (3 cc.) was heated at 160° under reflux for 4 hours. The mixture was cooled and then shaken with a warm (50° C.) solution of ferric chloride (10 g.) in water (15 cc.) and concentrated hydrochloric acid (3 cc.). The lower organic layer (2.71 g.) was separated and analysed by gas/liquid chromatography. It was found to contain unchanged bromopentafluorobenzene (1.74 g.) and pentafluorobenzonitrile (0.79 g.).

*Example 2*

A mixture of bromopentafluorobenzene (14.60 g.), cuprous cyanide (6.85 g.) and dimethylformamide (10 cc.) was stirred and heated at 180° for 11 hours. The mixture was cooled to about 50°, then poured into a warm (50°) solution of ferric chloride (30 g.) in water (45 cc.) and concentrated hydrochloric acid (10 cc.). The mixture was shaken, then the dark organic layer was run off into water and ether extracted. The ethereal solution was washed with water, dried (anhydrous magnesium sulphate), filtered and distilled to give a clear, colourless distillate (5.33 g.), B.R. 99–105°/98 mm. This product was analysed by gas/liquid chromatography and found to consist of predominantly one compound (92%). An infrared spectrum confirmed that the major component was pentafluorobenzonitrile.

*Example 3*

A mixture of bromopentafluorobenzene (44.10 g.), cuprous cyanide (20.50 g.) and dimethylformamide (30 cc.) was stirred and heated at 160–170°, under reflux for 6 hours. The warm (50°) mixture was shaken with a warm (50°) solution of ferric chloride (90 g.) in water (135 cc.) and concentrated hydrochloric acid (30 cc.). The organic layer was separated, and added to water (100 cc.). The organics were ether extracted (3 x 50 cc.), the ethereal solution washed with water, dried over anhydrous magnesium sulphate, filtered and distilled to give a colourless liquid product (31.45), B.R. 80–104°/110 mm. Analysis by gas/liquid chromatography showed it contained pentafluorobenzonitrile (75.5%) and bromopentafluorobenzene (22.0%).

*Example 4*

This example illustrates the use of N-methylpyrrolidone as an alternative solvent to dimethylformamide.

A mixture of bromopentafluorobenzene (20.0 g.), cuprous cyanide (9.2 g.) and N-methylpyrrolidone (14 cc.) was stirred and heated at 140–150° for 5 hours. The dark mixture was cooled to about 40° and shaken with a warm (about 40°) solution of ferric chloride (10 g.) in water (40 cc.) and concentrated hydrochloric acid (4 cc.). The lower organic layer was separated, washed with water, dried and distilled, giving a colourless liquid product (10.0 g.), B.R. 78–100°/98 mm. Analysis by gas/liquid chromatography showed it contained pentafluorobenzonitrile (59.6% by weight) and bromopentafluorobenzene (39.6% by weight).

*Example 5*

A mixture of iodopentafluorobenzene (15.00 g.), cuprous cyanide (5.3 g.) and dimethylformamide (7.7 cc.) was stirred and heated at 150° for 6 hours. The warm (50°) mixture was poured into a solution of ferric chloride (30 g.) in water (45 cc.) and concentrated hydrochloric acid (10 cc.), also at 50°. This mixture was shaken, and the lower organic layer separated, washed with water, dried (MgSO₄), filtered and distilled to give a product (6.12 g.), B.R. 96–102°/110 mm., which analysed by gas/liquid chromatography as pentafluorobenzonitrile (66%) and iodopentafluorobenzene (31%).

*Example 6*

Cuprous cyanide (274 g.) was added to a stirred mixture of bromopentafluorobenzene (601 g.) and dimethylformamide (400 mls.). The mixture was stirred and heated to 140–150° in 45 minutes and maintained at this temperature for 6 hours. The mixture was cooled to about 40° and poured into a warm (about 40°) solution of ferric chloride (250 g.) in dilute hydrochloric acid (1 litre of water and 100 mls. of concentrated hydrochloric acid). The mixture was shaken, the organic layer was separated and washed with water (2 x 200 mls.). The aqueous wash liquors, combined with the ferric chloride solution, were steam distilled, yielding further organic liquid which was combined with the main organic product. Fractional distillation of this product, using a 1 ft. long column packed with ⅛″ x ⅛″ glass helices gave fractions as follows:

(1) 171.1 g., B.R. 80–159°, 106.4 g. of $C_6F_5Br$, 31.6 g. of $C_6F_5CN$.
(2) 18.1 g., B.R. 159–160°, 0.8 g. of $C_6F_5Br$, 17.2 g of $C_6F_5CN$.
(3) 229.3 g., B.R. 160–161°, pure $C_6F_5CN$, $n_D^{20}$=1.4421.
(4) 50.5 g., residue, 26.4 g. of $C_6F_5CN$, 24.1 g. of unidentified compounds.

Fraction 3 showed infra-red bands at 2247 cm.$^{-1}$ assigned to —C≡N and bands at 1647 cm.$^{-1}$, 1508 cm.$^{-1}$ and 1441 cm.$^{-1}$ assigned to —$C_6F_5$.

*Example 7*

Pentafluorobenzonitrile (0.29 g.) was mixed with concentrated sulphuric acid (1 cc.). On shaking, the mixture became homogeneous and heat was evolved. The mixture was heated at 110–115° for 25 minutes, then cooled and poured on to ice, precipitating a solid. This was collected, washed with water and dried.

It weighed 0.22 g., M.P. 148°, and was slightly impure pentafluorobenzamide. It was recrystallised from benzene, when the pure compound was obtained (0.15 g.), M.P. 150.5°. In admixture with an authentic sample of pentafluorobenzamide, the melting point was not depressed. (Found: C, 39.8; H, 1.2; F, 44.4; N, 6.65. $C_7H_2F_5NO$ requires: C, 39.8; H, 1.0; F, 45.0; N, 6.6%.)

*Example 8*

A mixture of pentafluorobenzonitrile (0.40 g.), water (3 cc.) and concentrated sulphuric acid (3 cc.) was heated at 170–180°, under reflux, for 2 hours. Water (20 cc.) was added and the mixture was continuously ether extracted for 15 hours. The ether extract was dried (MgSC₄), filtered and evaporated to give a solid residue (0.27 g.). Recrystallisation of this solid from petrol ether (B.P. 80–100° gave pentafluorobenzoic acid (0.13 g.), M.P. 102.5–103.5°, and undepressed in admixture with an authentic sample. (Found: C, 39.4; H, 0.8; F, 44.3. $C_7HF_5O_2$ requires: C, 39.65; F, 44.8%.)

*Example 9*

A mixture of pentafluorobenzonitrile (94.4 g.) and bromopentafluorobenzene (26.0 g.) was heated with concentrated sulphuric acid (100 cc.) at 100° for 30 minutes, while stirring vigorously. The mixture was cooled in ice-water while 100 cc. of ice-cold water was added cautiously, causing precipitation of pentafluorobenzamide. The mixture was again heated at 130°, under reflux, while stirring vigorously, for 4 hours. After cooling, a lower organic layer solidified. The aqueous supernatant liquor was decanted (solution A). The organic product was mixed with water (200 cc.) and 20% sodium hydroxide was added, while stirring the mixture, until most of the solid dissolved, and the mixture remained alkaline.

An ether extract (3 x 50 cc.) of solution A was added and after shaking, the lower aqueous alkaline layer was separated and shaken with another portion of ether (50 cc.). The ether solutions were combined, dried (MgSO₄), filtered and the ether distilled. This left a solid containing some liquid. The liquid was pumped off into a cold trap, then distilled to give a distillate containing bromopentafluorobenzene (18.6 g.). The solid was pentafluorobenzamide (10.97 g.), M.P. 148–90°, undepressed in admixture with an authentic sample. Acidification of the alkaline aqueous phase, and ether extraction gave pentafluorobenzoic acid (81.5 g.), M.P. 101–3° after one recrystallisation from petrol ether, B.P. 80–100°.

Example 10

A mixture (733 g.) of pentafluorobenzonitrile and bromopentafluorobenzene, prepared from bromopentafluorobenzene and cuprous cyanide in dimethylformamide according to the procedure described in the previous examples, was mixed with concentrated sulphuric acid (440 cc.). The mixture was stirred and heated at 110–120° for 30 minutes. Then the mixture was cooled in ice while water (440 cc.) was added cautiously, and finally the mixture was heated at 110° for 6½ hours. Bromopentafluorobenzene was removed by steam distillation and the residual organic liquid crystallised on cooling. The crystals were collected, washed with water and dried. This product is pentafluorobenzoic acid (579 g.), M.P. 102–104.5°. It had an infra-red spectrum identical with that of an authentic sample. Further acid (31 g.) was isolated by ether extraction of the filtrate.

Example 11

A mixture of 1,4-dibromo-2,3,5,6-tetrafluorobenzene (1.00 g.), cuprous cyanide (0.63 g.) and dimethylformamide (1 cc.) was heated at 170–180° for 1½ hours. The mixture was cooled to 50°, then poured into a warm (50°) solution of ferric chloride (2 g.) in water (3 cc.) and concentrated hydrochloric acid (3 cc.). The mixture was ether extracted (2 x 20 cc.), the extract washed with water (10 cc.) dried (MgSO$_4$), filtered, and evaporated to leave a solid, contaminated with a dark oil. Washing the produce with a few mls. of methylated spirits removed the oily contamination. The cream-coloured powder remaining was purified by sublimation at 15 mm. pressure from a bath at about 120°. Pure 1,4-dicyano-2,3,5,6-tetrafluorobenzene was obtained as pale green crystals (0.19 g.), M.P. 197–8°. (Found: C, 47.9; F, 38.1; N, 14.1. C$_8$F$_4$N$_2$ requires: C, 48.0; F, 38.0; N, 14.0%.)

Example 12

A mixture of 1,2-dibromo-3,4,5,6,-tetrafluorobenzene (1.0 g.), cuprous cyanide (70 g.) and dimethylformamide (1 cc.) was stirred and heated at 160–180° for 6 hours. After cooling to about 50° the contents of the reaction flask were poured into a warm (50°) solution of ferric chloride (3 g.) in water (5 cc.) and concentrated hydrochloric acid (3 cc.). The mixture was stirred for 1 hour at 70–80° then the dark organic layer was run off and ether extracted. The aqueous layer was extracted, with ether (5 x 20 cc.), separated and the combined ether extracts were washed with water, dried over magnesium sulphate, filtered, and distilled yielding a brown solid contaminated with a dark oily material. Washing this product with a few mls. of alcohol removed the oil. The brown solid was purified by sublimation at 10 mm. at 140° C. giving 1,2-dicyano-3,4,5,6-tetrafluorobenzene as pale blue-green crystals (0.2 g.), M.P. 83–84° C. (Found: C, 47.8; F, 36.6; N, 14.1. C$_8$F$_4$N$_2$ requires: C, 48.0; F, 38.0; N, 14.0%.)

Example 13

Cuprous cyanide (3.35 g.), 1,3-dibromo-2,4,5,6-tetrafluorobenzene (5.0 g.) and dimethylformamide (4 cc.) were heated while vigorously stirring at 160–180° for 4½ hours. The mixture was cooled to 50°, then poured into a warm (50°), solution of ferric chloride in water (20 g. in 30 cc.) and concentrated hydrochloric acid (30 cc.). The dark brown mixture was extracted with benzene (5 x 25 cc.), washed with hydrochloric acid 50% (25 mls.) followed by 10% sodium hydroxide solution (2 x 25 mls.). The extract, after drying over MgSO$_4$, was filtered and distilled leaving a dark brown solid which was purified by sublimation at 10 mm. from a bath at 160–170°. The pure white crystalline 1,3-dicyano-2,4,5,6-tetrafluorobenzene (0.9 g.) melted at 196–198°. (Found: C, 47.9; F, 38.2; N, 14.0. Calculated for C$_8$F$_4$N$_2$: C, 48.0; F, 38.0; N, 14.0.)

Example 14

A mixture of 1,2-dicyano-3,4,5,6-tetrafluorobenzene (2.0 g.) and 50% sulphuric acid (10 mls.) was heated under reflux at 140° for 4 hours. The cool solution was then poured into water (50 mls.) and made alkaline, extracted with ether and acidified. The acid solution was extracted with ether (5 x 20 cc.) and the extract dried (MgSO$_4$) and evaporated to leave a white solid which was recrystallised from xylene to give tetrafluorophthalic acid (1.4 g.), M.P. 156–158°. (Found: C, 39.9; H, 1.2; F, 30.8. Calculated for C$_8$H$_2$F$_4$O$_4$: C, 40.4; H, 0.8; F, 31.0%.)

We claim:
1. 1,2-dicyano-3,4,5,6-tetrafluorobenzene.
2. 1,3-dicyano-2,4,5,6-tetrafluorobenzene.
3. A method for preparing a fluorinated nitrile from the group consisting of pentafluorobenzonitrile; 1,2-dicyanotetrafluorobenzene; 1,3-dicyanotetrafluorobenzene; and 1,4 dicyanotetrafluorobenzene, comprising heating a compound from the group consisting of C$_6$F$_5$Cl, C$_6$F$_5$Br, C$_6$F$_5$I, C$_6$F$_4$Cl$_2$, C$_6$F$_4$Br$_2$ and C$_6$F$_4$I$_2$ with cuprous cyanide in a polar aprotic solvent selected from the group consisting of dimethylformamide and N-methylpyrrolidone at a temperature between 100° C. and 200° C.
4. A method as claimed in claim 3, in which the polar aprotic solvent is dimethylformamide.
5. A method as claimed in claim 4, in which heating is carried out between 140° C. and 180° C.
6. A method as claimed in claim 4, in which heating is carried out for from 4 to 8 hours.
7. A method as claimed in claim 3, in which the polar aprotic solvent is N-methylpyrrolidone.

References Cited by the Examiner

UNITED STATES PATENTS 3,046,313  7/1962  Pummer et al. _____ 260—465 XR

FOREIGN PATENTS 861,898  3/1961  Great Britain.

OTHER REFERENCES

Florin et al.: Journal of Research National Bureau of Standards, 1959, vol. 62, pp. 107–112.

CHARLES B. PARKER, *Primary Examiner.*

DALE R. MAHANAND, JOSEPH P. BRUST,
*Assistant Examiners.*